US008887208B1

(12) United States Patent
Merrit et al.

(10) Patent No.: US 8,887,208 B1
(45) Date of Patent: Nov. 11, 2014

(54) PORTABLE REAL-TIME VIDEO SIGNAL CAPTURING, TRANSFORMING AND RELAY SYSTEM FOR TRANSMITTING HIGH FEDELITY VIDEO IMAGERY BY WIFI TO PORTABLE VIDEO IMAGING DEVICES

(71) Applicants: David Aaron Merrit, Ridgecrest, CA (US); Andrew John Zetts, San Diego, CA (US)

(72) Inventors: David Aaron Merrit, Ridgecrest, CA (US); Andrew John Zetts, San Diego, CA (US)

( * ) Notice: Subject to any disclaimer, the term of this patent is extended or adjusted under 35 U.S.C. 154(b) by 43 days.

(21) Appl. No.: 13/866,226

(22) Filed: Apr. 19, 2013

Related U.S. Application Data

(60) Provisional application No. 61/635,802, filed on Apr. 19, 2012.

(51) Int. Cl.
| | | |
|---|---|---|
| *H04N 7/18* | (2006.01) | |
| *H04B 7/185* | (2006.01) | |
| *H04W 4/00* | (2009.01) | |
| *H04W 40/00* | (2009.01) | |
| *H04N 7/24* | (2011.01) | |

(52) U.S. Cl.
CPC ...................................... *H04N 7/24* (2013.01)
USPC .............. 725/76; 370/316; 455/431; 455/428

(58) Field of Classification Search
CPC ....................................................... H04N 21/00
USPC .............................. 725/76; 455/428; 370/316
See application file for complete search history.

(56) References Cited

U.S. PATENT DOCUMENTS

| | | | |
|---|---|---|---|
| 5,999,525 A | 12/1999 | Krishnaswamy et al. | |
| 2005/0053026 A1* | 3/2005 | Mullan et al. ................. | 370/316 |
| 2006/0040614 A1* | 2/2006 | Chapelle et al. ............. | 455/13.4 |
| 2006/0154660 A1* | 7/2006 | Waugh et al. ................. | 455/428 |
| 2007/0021117 A1* | 1/2007 | McKenna et al. ............. | 455/431 |
| 2010/0279745 A1 | 11/2010 | Westcott et al. | |
| 2012/0222545 A1* | 9/2012 | Niv .............................. | 89/36.08 |

* cited by examiner

*Primary Examiner* — Nasser Goodarzi
*Assistant Examiner* — Tariq Gbond
(74) *Attorney, Agent, or Firm* — Douglas C. Murdock

(57) ABSTRACT

Disclosed is a method and system for capturing analog video broadcast, converting the analog signal to a digital signal and rebroadcasting of said digital signal so that the video stream can be accessed by wireless hand-held video imaging devices. The methodology and system includes at least one video receiver connected to a signal converter and transmitter for signal demodulation, transfer and conversion of signal for rebroadcast of signal wirelessly via WiFi.

27 Claims, 12 Drawing Sheets

Figure 6
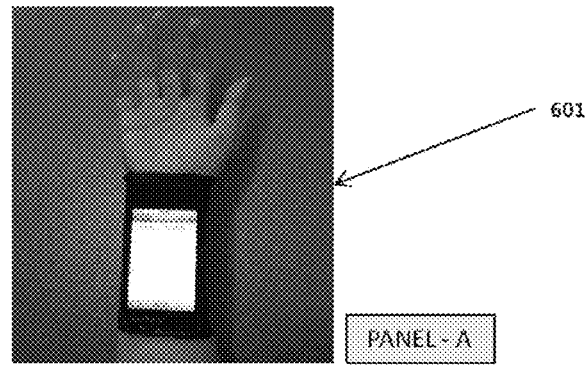
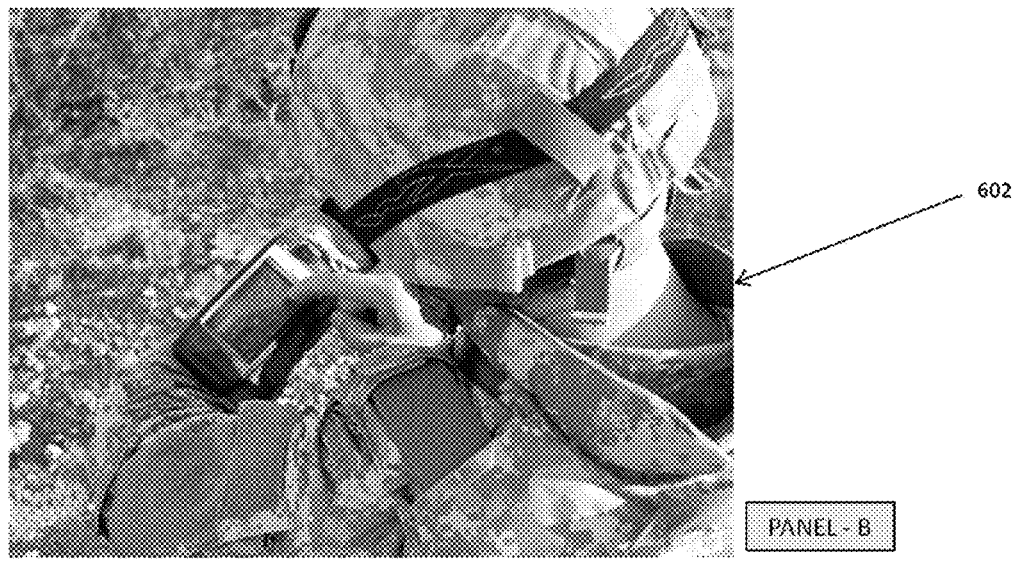

Figure 11
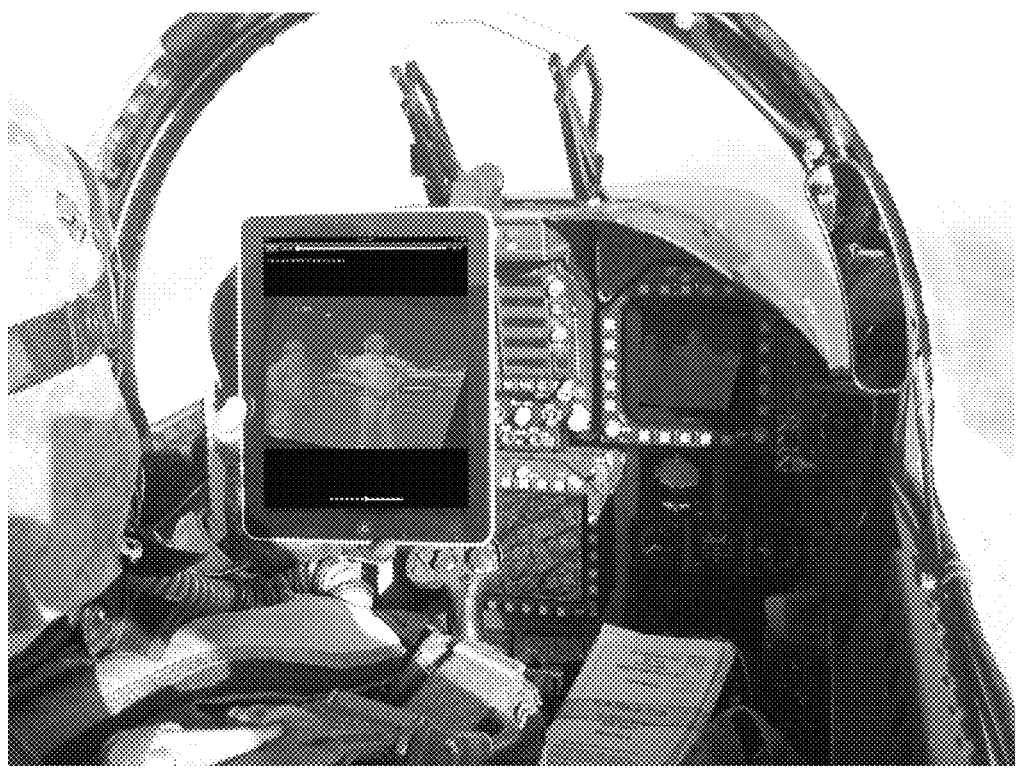
Figures 12A, B, and C
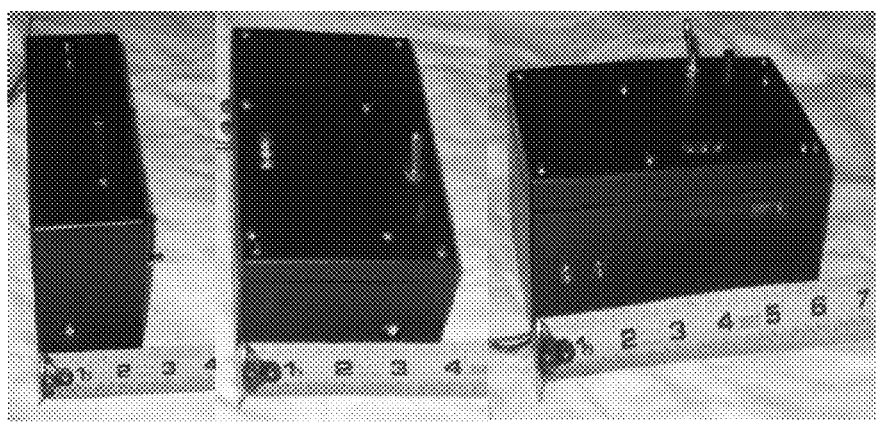

PORTABLE REAL-TIME VIDEO SIGNAL CAPTURING, TRANSFORMING AND RELAY SYSTEM FOR TRANSMITTING HIGH FEDELITY VIDEO IMAGERY BY WIFI TO PORTABLE VIDEO IMAGING DEVICES

RELATED APPLICATIONS

This invention claims the benefit of U.S. Provisional Application Ser. No. 61/635,802, filed Apr. 19, 2012.

FIELD OF THE INVENTION

This invention relates generally to the field of electronic communications, particularly communication between electronic devices. More specifically, this invention relates to electronic video transmissions and capture and display between wireless devices. Even more specifically, this invention relates to a system for capturing and retransmitting high fidelity video imagery in real-time to hand held WiFi networking video screen devices used by military pilots, law enforcement, fire and search and rescue, commercial entities and individuals.

BACKGROUND OF THE INVENTION

The following description in this Background section includes information that may be useful in understanding the present invention. It is not an admission that any such information is prior art, or relevant, to the presently claimed inventions, or that any publication specifically or implicitly referenced is prior art.

In the world of Intelligence, Surveillance, and Reconnaissance (ISR), the advantage of perspective from high altitudes, i.e., a measurable distance above the earth, has become well recognized. Consequently, in recent years there has been a focus on, and proliferation of platforms for, placing high resolution cameras with strong magnification capabilities in aircraft of all sorts. Moreover, such camera systems have included both high resolution still photography as well as video. Although application of such systems has been predominated by military users, as the world has become increasingly global, the interested audience has expanded to private, commercial and local government bodies. For example, Google Earth has used satellite generated images to provide the public with earth surface view perspectives never before available via the internet. Distribution of such imagery via the worldwide web is growing daily.

Despite the measured present availability of such aerial cameras' picture and video perspectives, there is still a significant shortcoming in the ability to access and use such visual information on a real-time basis. This is not only true for civilians but also for military and local government agencies. Although there have been many advances in manipulating such camera data for real-time access, use, and data storage, there remains a distinct shortfall in the area of accessing, viewing, and manipulating video in real-time as it is captured and/or broadcast. The future of viewing remotely broadcast video in real-time requires migration away from hardwired systems that use wires and cables. Typically, such commonly accessible video equipment is cumbersome, heavy, material dependent, and inflexible in application. Even current wireless systems are solitary non-interoperable systems that are typically large, heavy, battery limited, and cost prohibitive to the individual user. These deficiencies make it evident that a serious need has arisen to make the task of viewing live aerial perspectives, such as ISR video, or other similar remotely broadcast signals, a more user-friendly, portable, widely distributable and interoperable experience.

Military, law enforcement, fire and search and rescue communications technologies have evolved greatly over the past 30 years. Presently, highly complex electronic communication relay systems exist which can disperse valuable information to appropriate personnel. For example, in law enforcement, ground-based patrol officers communicate by radio to dispatch centers which can relay or directly connect radio communications between the ground-based officer and another ground-based patrol officer or between the ground-based officer and airborne support units such as in fixed wing or rotary wing aircraft. In such example, airborne law enforcement personnel, wherein the aircraft is equipped with high fidelity camera systems, can relay by radio to ground personnel the position of a target or suspect, which facilitates successful capture of said target. Although such an intercommunication system is highly valuable, it is limited in the nature of the information provided between communicating personnel. Often times, the ground-based officer is working in night time environments, operating 'blind' in that he may not have familiarity with the local environment and must rely on the verbal communications of distantly located operational units (relay headquarters or airborne platform) and, if available, overhead searchlights.

Similarly, ground-based search and rescue teams and fire brigades rely on radio communication technologies. For example, line firemen, working in thick smoke and windy conditions may need to rely on oral communications between themselves, helicopter pilots, and/or command center positions. While the availability of such communications is invaluable to saving lives of firemen and in supporting the successful termination of a wild fire, there is still a need to have even better cross communication between said various placed personnel. If a line fireman must avoid an advancing wall of flames, oral communication may not be sufficient for the fireman to recognize where he needs to reposition himself to remain safe. This is particularly the case where the terrain is rugged and where the fireman is unfamiliar with the topographical peculiarities of the local area. A failure in communication could result in the fireman heading in a dangerous direction. Under such conditions the fireman has to mentally visualize what is being described to him via radio and apply it to what he sees, whereas if he cannot see because of such things as smoke or darkness or dense foliage or even building layouts blocking views, his danger level increases markedly. Thus, the ability to see an overhead perspective directly by viewing a live video of his position would be invaluable.

In military settings, particularly regarding Air Force, Navy and Marine pilots, there is a need to communicate with ground personnel regarding ground-based targets. Typically, the pilot is positioned above an engagement theater, such as in an F/A-18, A-10 Thunderbolt, or attack helicopter (black hawk, apache, cobra). These aircraft possess Intelligence Surveillance and Reconnaissance (ISR) technology comprising highly advanced camera systems (e.g., Litening Pod, ATF-LIR, or Sniper Pods), that the airborne observer (pilot) must make use of via the hard wired cockpit television controls and screen to see the target captured by the camera. He must then relay by oral communication specifics regarding the target, such as whether or not the target, for example an enemy person, is carrying or equipped with weaponry. If the pilot cannot clearly distinguish such specifics about the target, he could misinform ground-based troops or command centers that the target is hostile when in fact there is no presence of weaponry. In such example, the possibility of mistaken identity is present. This is particularly a situation that is prevalent due to the nature of the viewing monitors installed into the aircraft itself.

Despite the high definition pixel capacity of the ISR camera systems installed in the aircraft, in the F/A-18 and other aircraft, the in-cockpit viewing monitor digital display indicator (DDI) is a green monochrome cathode ray tube having a pixel resolution of only 640×480 and further still, has a viewing area of only 5×5 inches or less. To employ such a monitor, which is 30 year old technology, the pilot must often lean severely forward in his seat, shield his eyes and screen from glare (if during daylight hours) and try to determine the nature of the target. Often, because of the lack of pixel clarity and fuzziness of the monochromatic monitor screen, pilots have trouble making a call as to the hostile disposition of the target. Lack of clarity results in lost opportunities, higher costs of missions, and can result in the possibility of causing unintended injury via collateral damage. The pixilation of the built-in camera is far lower than HDTV (1080p=1920×1080, or an iPad3 (2048×1530). The short of it is that today's soldiers cannot afford to err when engaging the enemy. Non-combatant deaths and/or casualties are the leading cause of detriment to accomplishing the mission in war. Non combatant deaths and casualties have strategic implications at the highest levels and therefore the absolute highest level of care must be taken to ensure the correct people are engaged.

Further, pilots of strike aircraft, such as the F/A-18, must 'strictly,' use the electronic equipment built into or approved for use in the plane. There are no internal power ports and loose wires are not allowed in the cockpit. Thus, there is no possibility of employing existing cross-communications systems in the cockpit. For example, in one such system, the video scout-MXR™, by Interstate Electronics (San Diego, Calif.), provides a lap top computer and monitor system designed for ground based troops to access video imaging capability from an ISR platform that can be rebroadcast to additional MXR units for use by other ground-based personnel. Such device is programmed to be used on the ground and possesses computer software to perform functions such as mapping out terrain. Further, this device possesses multiple external antennas which are extremely easy to break off in rugged handling and further still, due to its weight, is impossible to use in the aircraft's cockpit as it is too large and heavy and requires connection to a power source sufficient to allow continuous operation over the length of the flight mission. Further still, due to the weight, size and other ergonomics of equipment such as MXR, such systems will not pass approval for use in tactical strike aircraft. Such systems are designed for use in retrieving FM generated video signal transmitted by the aircraft's camera system which is fed directly into the MXR computer system and used by ground-based command centers and troops. Importantly, the existing systems do not have the contemplation of broadcasting captured images by WiFi networking. The pilot therefore remains with only the monochrome 5×5 screen and his radio. Thus, despite systems which can exploit video transmission, there is still a shortcoming in that in such situation the ground personnel may be able to see what the camera is pointed toward but cannot view such images away from their base camp. Further, the difficulty in communication with the pilot who cannot see the same image or clarity still remains.

Thus, there is still a need for systems and methodologies of electronic communication and processing of video transmission that will improve the ability of airborne pilots, to process real-time video imagery with clarity and communicate with ground based troops, police, fire and other personnel.

SUMMARY OF THE INVENTION

In a first embodiment, the present invention provides for an article of manufacture that addresses the disadvantages of prior systems and methods mentioned above, namely, expansion on the technology of real-time video capability by combining electronic technology architecture to accomplish a novel functionality in a user-friendly, portable, and widely distributable and interoperable way.

In a second embodiment, the invention provides the ability to receive a wide spectrum of remotely transmitted video data streams and convert that data stream into one that can be broadcast over a wireless (WiFi) network. In a related embodiment, the invention comprises a portable battery powered system further comprising a low power requirement. Further still, the invention avoids a "wired" infrastructure from receiver to a viewing device and creates its own wireless network producing streaming data compatible with any WiFi equipped viewing device including COTS technology e.g., smart cell phones and iPad tablets. COTS technologies are Commercial Off-The-Shelf meaning that they are readily available commercial products.

In a third embodiment, the invention provides for the ability of a pilot, while flying airborne and operating an airborne camera system, to receive the electronic signal of the video stream transmitted from the airborne aircraft's digital or analog camera system and convert said signal to a digitally encoded WiFi signal capable of capture and display on a mobile video monitor. In a related embodiment, the invention likewise provides for ground-based personnel to obtain and display the electronic signal of the video stream transmitted from an airborne camera system (i.e., an air to ground radio signal) and through said conversion of signal, digitally encode the signal for retransmission by WiFi to a portable video imaging device.

In a fourth embodiment, the invention comprises, among other things, (1) an analog and/or digital video receiver capable of capturing a variety of frequencies, including, but not limited to, L-Band analog broadcast at between 1.71-1.85 GHz, S-B and broadcast at between 2.0 and 4.0 GHz, C-Band analog video broadcast at between 4.0 and 8.0 GHz, more typically an analog signal between 4.4 and 4.85 GHz or alternatively a digital signal between 5.24 and 5.85 GHz, Ku-Band signal between 12.0 and 18.0 GHz, K-Band signal between 18.0 and 26.5 GHz, and Ka-Band signal between 26.5 and 40.0 GHz, (2) an analog to digital video converter, (3) an adhoc 802.11n WiFi broadcast networking router, and (4) a rechargeable power source, all within (5) a hand-held portable housing.

In another embodiment, the invention uses digital video streaming software as is well understood by those of skill in the electronic arts, wherein such software is compatible with WiFi modem and networking and the rebroadcast digital video signal can be captured and imaged on any compatible system including, but not limited to, a computer system, an iPad or an IPhone each having compatible video streaming software and a WiFi modem.

In still another embodiment, the digital signal rebroadcast comprises a streaming HD digital video signal employing high profile H.264 (L4.1) compression, a bit rate of about between 250 Kbps and 10 Mbps and a latency period from input of about 0.5 seconds. Thus, in a preferred embodiment, the streaming of video signal is virtually real time.

In further embodiments, the invention can comprise off the shelf components such as for example a Teradek Cube 550™ (Irvine, Calif.) wired to an AMP (Reno, Nev.) video signal receiver, VSR1 and a rechargeable battery operating both. In such example, the VSR1 is an RF video receiver while the Cube is a device that provides for streaming HD video over WiFi. In a preferred embodiment, the Cube creates its own (ad hoc) wireless network and streams HD video directly to a decoder, a computer, server, or mobile device without the need for any other networking equipment.

Other features and advantages of the invention will be apparent from the following drawings, detailed description, and appended claims.

BRIEF DESCRIPTION OF THE DRAWINGS

FIGS. 6 A, and B are photographs depicting an alternate embodiment of the invention wherein the present device (comprising capabilities for data streaming capture from ISR systems and rebroadcast by WiFi) integrated with a WiFi ready video imaging device such as a smart or iPhone.

FIG. 11 is a photograph of the inside of the cockpit showing access to an iPad.

FIGS. 12 A, B, and C show pictures of the device itself with its dimensions displayed via ruler.

DETAILED DESCRIPTION OF THE INVENTION

As those in the art will appreciate, the following description describes certain preferred embodiments of the invention in detail, and is thus only representative and does not depict the actual scope of the invention. Before describing the present invention in detail, it is understood that the invention is not limited to the particular device arrangements, systems, and methodologies described, as these may vary. It is also to be understood that the terminology used herein is for the purpose of describing particular embodiments only, and is not necessarily intended to limit the scope of each claim.

Figure 1:
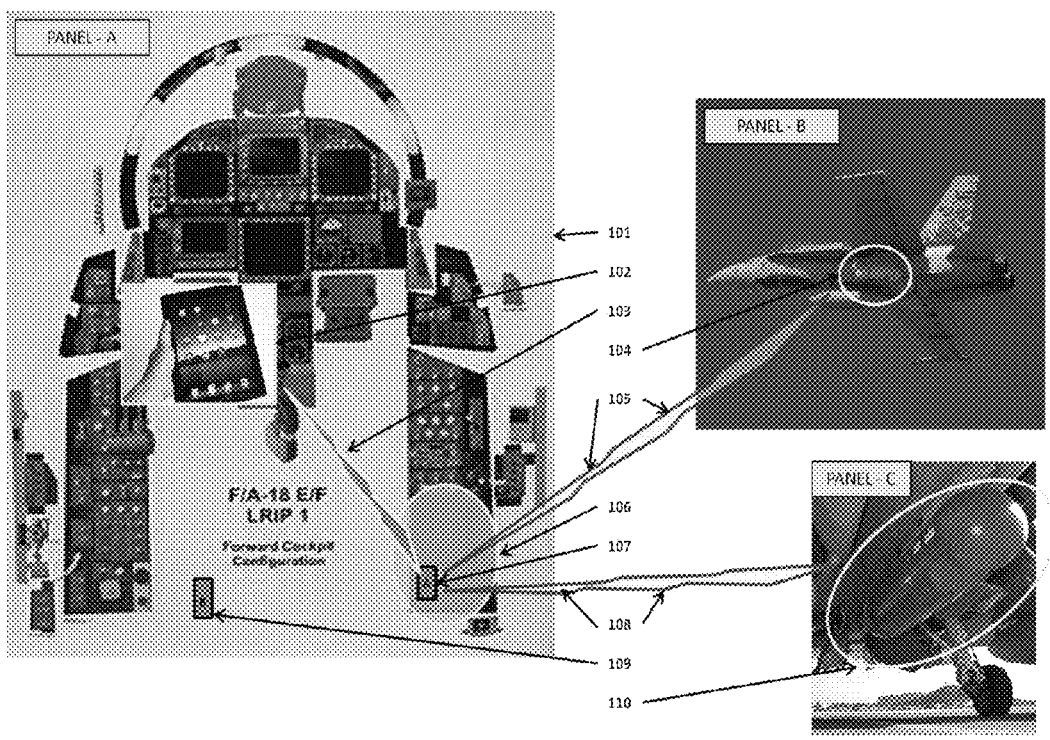
FIGS. 1A, B, and C are photographic images depicting in panel A the instrument layout of the inside of an F/A-18 aircraft cockpit wherein the portable present device is placed in the pilot's flight bag 106 or flight suit pocket (at position 109). In panels B and close up C are photographs of the pod carrying camera and video signal system attached to the undercarriage of the aircraft.
Figure 3:
FIG. 3 is a photographic image showing a pilot with the position of the present device depicted as being in the aviator's shoulder pocket 121. (device not actually shown but indicated as to location.)

Turning now to the invention, FIGS. 1A, B and C depict one example of how the invention can be used. Specifically, the invention comprising an analog/digital signal receiver and digital WiFi broadcast device can be placed in the pilot's flight bag within the cockpit and the pilot can simply hold an iPad on his lap to view images from the aircraft's camera system. The pilot need not have to rely on only a 5×5 or smaller green monochromatic screen. In FIG. 1A, cockpit diagram of an F/A 18 aircraft 101 shows that the present device 107 or alternatively, 109, can be placed within the cockpit inside the pilot's helmet bag 106 or in the pilot's flight suit 109 such as within a pocket of the suit (not shown but see FIG. 3, 301). The device will capture video data being transmitted 105 or 108 (panels 1B and 1C) by the aircraft's outboard camera system 104 or 110 (panels 1B and 1C) attached to the underside of the aircraft. Typically, the video data of the outboard camera system can be an advanced FLIR system possessing Infra Red (IR), black and white, and color video capability. In use, the present device 107 or 109 can receive the data stream from the outboard system and retransmit it over WiFi 103 to a hand held video imaging device 102 such as a COTS, WiFi capable device including but not limited to iPad, laptop, or iPhone. The iPad 102 is shown in the figures as it is cleared for use in strike aircraft.

The present device uniquely provides a simple streamlined capability for a user, such as a pilot, to obtain real-time streaming video images by WiFi from a remotely placed video camera broadcast system, such as an aircraft's hardwired camera and digital or analog video transmission system. In a further embodiment, the WiFi signal can be captured and viewed by any WiFi compatible system including, but not limited to, an iPad, or iphone, or computer such as a laptop. In preferred embodiments, the professional in need of wirelessly viewing video transmission from a remote based camera system, such as an airborne camera, can include any of police, firemen, search and rescue personnel, helicopter pilots, and fixed wing aircraft pilots.

Figure 2:
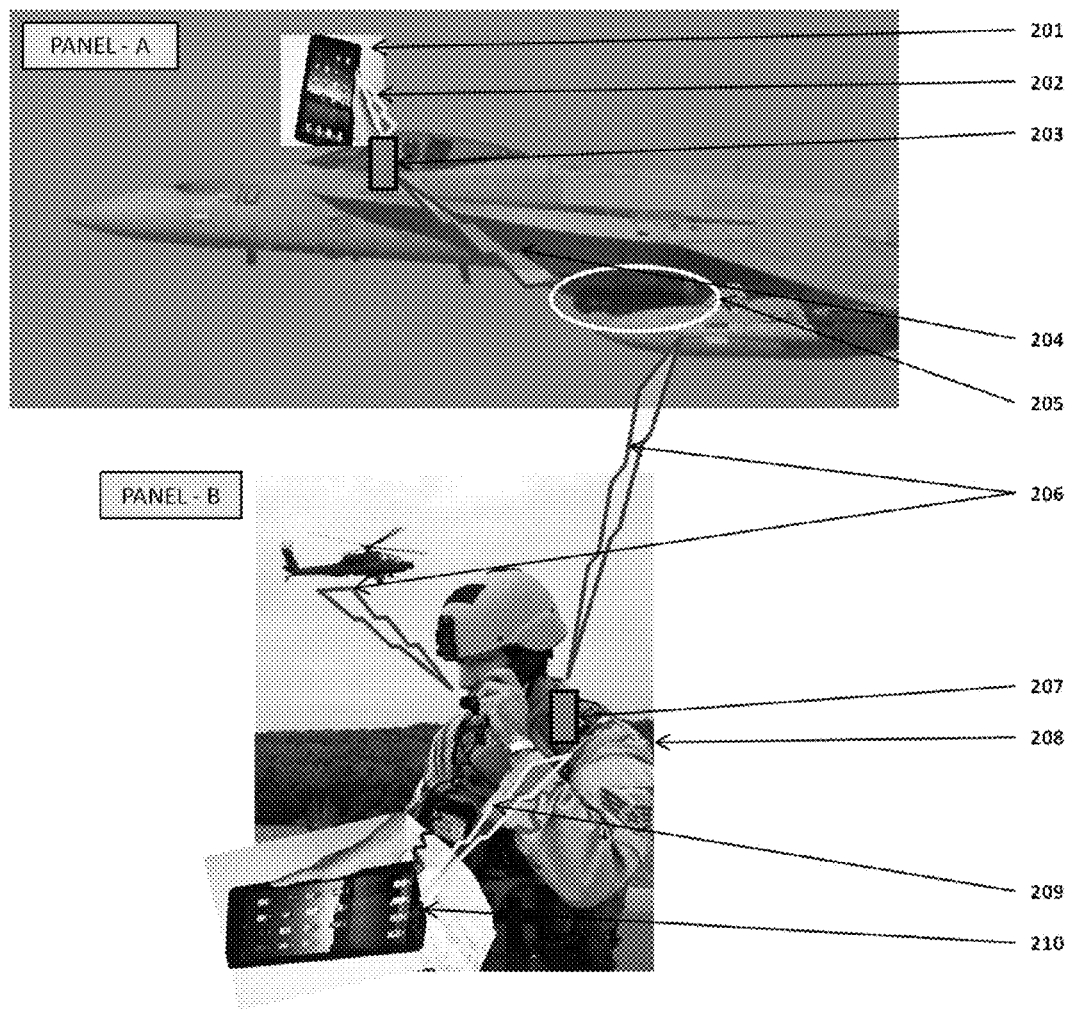
FIGS. 2A and B are photographic images showing in A a camera/video signal from the aircraft's camera pod capable of being captured by the present device within the aircraft cockpit, or as shown in B, captured by a ground placed present device being worn by personnel. Also depicted in B the present device can acquire signal also from different aircraft such as a helicopter. In both A and B the present device can rebroadcast a WiFi digital signal to a portable video device.

In operation, the present device can acquire secured frequency analog or digital signal, the signal strength of which is intentionally powerful so as to be capable of capture by receivers at distant locations, such as between an aircraft and receiver numerous miles apart from one another. The present device comprises just such a receiving capability for receiving digital and/or analog video signal. The present device user can set the frequency desired to be captured and commence observing the video stream on a viewing device by the immediately generated WiFi signal. For example, as depicted in FIGS. 2A and 2B, aircraft mounted camera system 205 transmits signal 204 which not only can be captured by the present device 203 in the cockpit and retransmit the video signal via WiFi 202 to hand held device 201, the video signal (here noted as 206) emanating from the aircraft camera system can be captured by a remotely located present device 207 such as on a person, such as a soldier, police or fireman etc, 208 on the ground. Such ground personnel can use the present device to send a WiFi signal 209 to a viewing device 210. Further still, as shown in FIG. 2B, the outboard camera system of a helicopter can also stream data 206 to a ground based person as well. Where a soldier needs to acquire and use data from two independently broadcasting sources, such as the outboard camera system of a fixed wing strike aircraft and of a rotary wing craft, the present device can be manipulated to receive the signal of particular frequencies so that multiple channels of data signal can be captured and displayed on the soldier's video monitor. In further related embodiments, the present device can be integrated with a mobile video viewing device such as an iPhone as depicted in FIGS. 6A and B. In such embodiment, the present device is contemplated to broadcast a WiFi signal directly to the video imaging device wirelessly or can be wire mounted so that the present device can both transmit video data by WiFi to other nearby mobile video viewing devices, and by hardwire to the mounted mobile video device. Further still, for practical reasons, the integrated present device can be removably mounted to a pliable but resilient tough material designed to be attached to the forearm of a human wearer.

Additional applications for use by an aviator, particularly a military pilot, include use in the unlikely event that the pilot must eject from his or her aircraft. The present device can act to support situational awareness by allowing for continued communication with other aircraft in the air above the downed pilot. For example, where the device has been placed in the flight suit, it can be used by the pilot to aid his or her own search and rescue or even escape and evasion from hostile forces. Specifically, the downed pilot can access his personal cell phone, such as an iPhone, and have it act as the video imaging device and adjust the present device's frequency receiver to match and receive the signal from another aircraft overhead e.g., his or her wingman, for example. The images received can provide instant situational awareness regarding the terrain and enemy around him/her. Additionally, this technology can be used to help a dual-piloted aircraft's crew find one another if they both were to end up on the ground post ejection. Moreover, it can offer immediate insight to the preferred direction of travel for a downed aviator to evade enemy forces. Furthermore, it can simply offer the over-flight perspective of the downed aviator's surroundings, which may help him or her find shelter, friendly forces, or a nearby watercraft in the event of a water landing. In yet a further application where the downed aviator must eject at night without the benefit of a night vision device, the present device with a video imaging device, such as an iPhone, can be used to instantly provide awareness of the dark environment around the downed aviator. Navigating his or her terrain will be exponentially easier thanks to the perspective provided by overhead video data streaming from an overhead craft. In a further related embodiment, friendly forces that are already monitoring the wingman's camera system's feed using other means, can simultaneously see and appreciate the situational awareness of the downed aviator and coordinate communication via pre-briefed signals. The present device can therefore help close the loop on what a downed aviator and those who are trying to rescue him both know about the real time circumstances. The ability to view high fidelity video on a high fidelity screen gives the war fighter, whether on the ground or in the cockpit of an airplane or otherwise, the absolute best chance at identifying the nature and intent of his enemy and his or her surroundings. More hostile enemy will be positively identified instead of remaining ambiguous. More hostile enemy will therefore be able to be prosecuted while keeping friendly troops safe. That said, friendly troops and the nature of their activities will be able to be identified easier as well, adding to their safety when aircraft are in an over-watch position. When a pilot needs to make a decision as to what he views, this invention gives him the best chance of making the right call.

Figure 5:
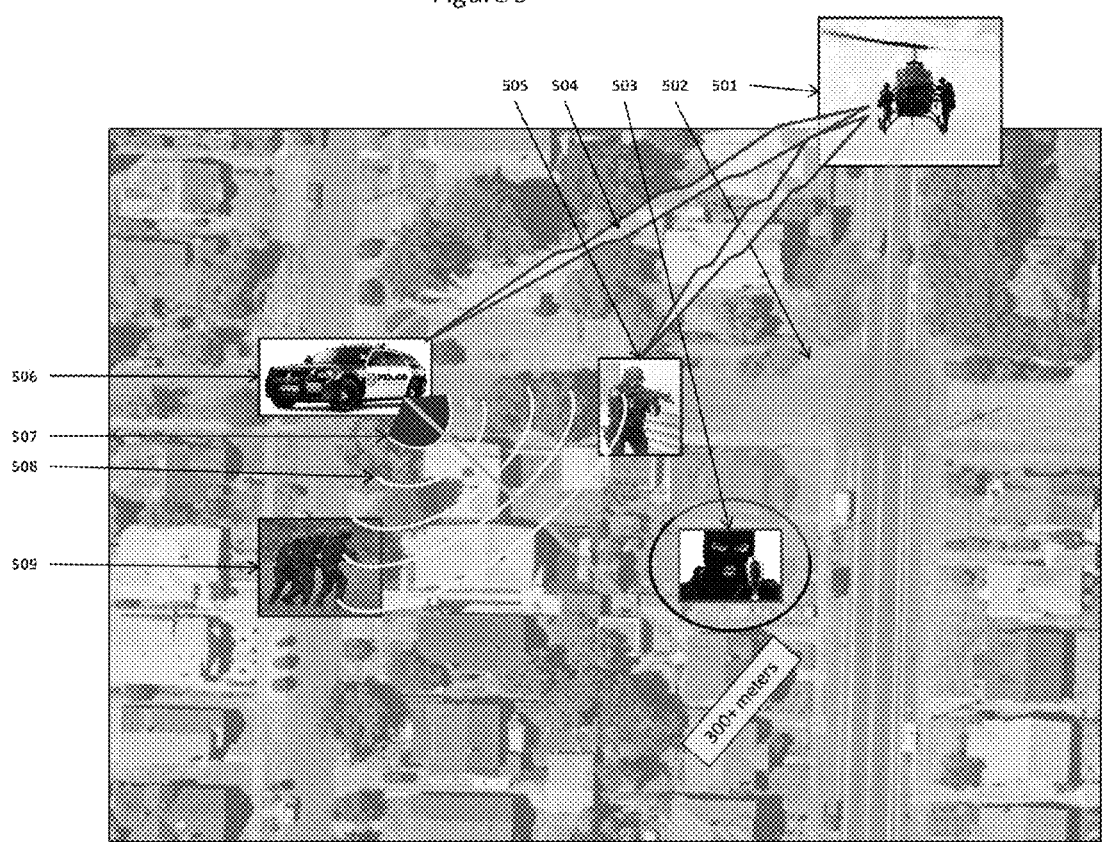
FIG. 5 is a composite aerial photograph depicting one embodiment of the invention wherein local law enforcement can access video streaming directly from the overhead based camera wirelessly.
Figure 7:
FIG. 7 is a photo of the inside of a squad car showing use of a laptop computer that can be configured to stream WiFi data streamed from the present device.

With respect to pilots of fixed wing and rotary wing aircraft therefore, the device can be placed within the cockpit or placed in available space compartments outside the cockpit. For police, fire and rescue, the present device can be readily carried as an additional module within the squad car (FIG. 7), or on the person, such as in the users pocket or attached to wearable equipment such as belt, harness, or backpack. For example, as depicted in FIG. 5, a police officer 505 or group of enforcers 507, can, with the present device located either on their respective bodies or alternatively placed in the squad car, can exit his vehicle and pursue a person of interest 503 on foot all while having the ability to watch, in real time, video 502 from overhead helicopter mounted camera 501, being broadcast 504 to present devices that instantly retransmit by WiFi signal to personal WiFi compatible viewing devices thereby allowing him to pinpoint the suspect's exact location, and to very importantly know ahead of time the nature of obstacles in his path. The officer can employ any of a lap top, iPad, or WiFi compatible telephone such as an iPhone while on foot. Further, the WiFi digital broadcast signal from the present device has a signal range of at least 300 meters. Thus, if the present device is located in the squad car, for routine police work in searching areas not too distant from the squad car, the nearby officer can receive real-time video. Alternatively, if the officer is wearing the present device, he/she can receive directly from the over head ISR source and view video at any distance from the vehicle as the analog or digital broadcast emanating from the airborne camera can be captured by the carried present device.

Figure 4:
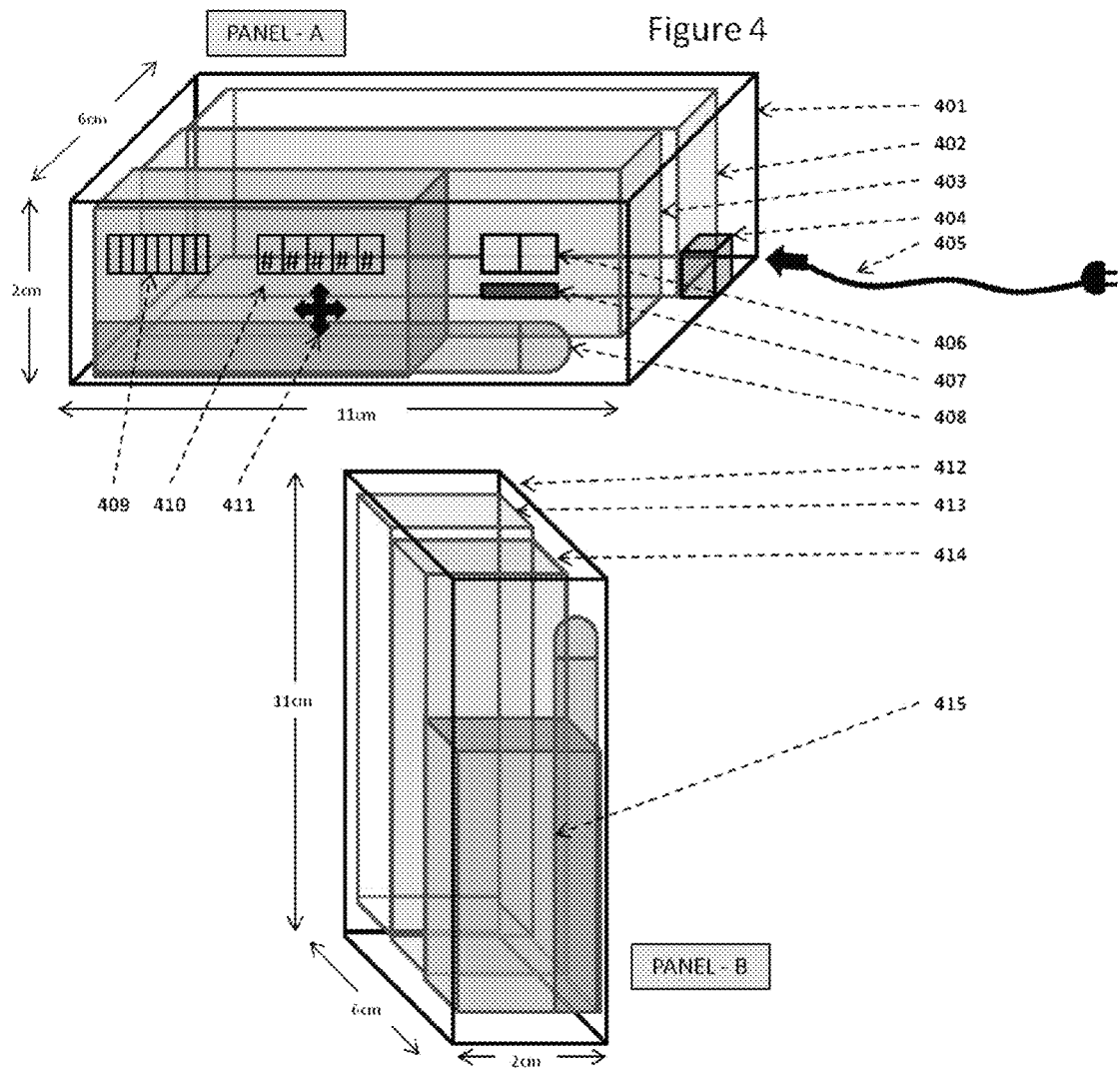
FIGS. 4 A, and B are block diagrams showing compact spatial arrangement of present device components.

In related embodiments, the present device (FIGS. 4A and B) comprising among other things a receiver such as a digital and/or analog signal receiver 408 (e.g., for example a AMP VR-75, VSR1 or other receiver), video encoder/compressor, WiFi signal transmitter/adhoc network creator 402, an on/off switch 406, a power on indicator 407, a signal strength indicator 409, a frequency indicator readout 410, frequency adjustment control 411, a rechargeable battery 403, and an external power source plug 404 for a power source cable 405 for connecting to such as a DC power source or AC power source capable of conversion into DC. Use of an external cord can apply to mounted applications such as within a police vehicle, and antenna. Finally, the device components can be housed in a small cigarette package sized portable configuration 401 and in such a manner as to withstand hard handling of such as combat or extreme conditions. The housing containing the components can be metal and/or plastic capable of withstanding rugged handling. In a future embodiment the components comprising the present device are completely interchangeable and replaceable without affecting the integrity of the device. For example, if a specific frequency band, and only that band, were needed to be received, the universal receiver on the base model could be removed and replaced by a receiver that received signals only within the specific band. Similarly, the power source, such as a battery, could be removed and replaced similarly to how digital cameras with rechargeable batteries work today.

The present device has the capability of detecting an analog or digital video signal being broadcast from the aircraft air to ground video data broadcast system. The device is capable of capturing the signal via an internal antenna having a frequency capture spectrum of from between 1.625 and 15.35 GHz. The signal from such system is typically an output signal that is broadcasting digital and/or analog NTSC or PAL video/audio of any of L-Band, S-B and, C-Band, Ku-Band, K-B and Ka-Band. In one preferred embodiment, the present device can accommodate a varying range of frequency capture. This can be accomplished by a frequency dial for dialing in either the analog or digital incoming signal, or can alternately be accomplished with a frequency range card such that in use, the present device can capture signal within a defined region of analog or digital space. This feature will allow for usage of multiple present device units, each transmitting signals without causing cross talk by, for example, improper tuning of frequency by an operator who is supposed to be capturing signal from only one emitting source. Examples of frequency ranges used and/or useful for long range video signal broadcast and that can be captured by the present device are disclosed in Table I.

Figure 8:
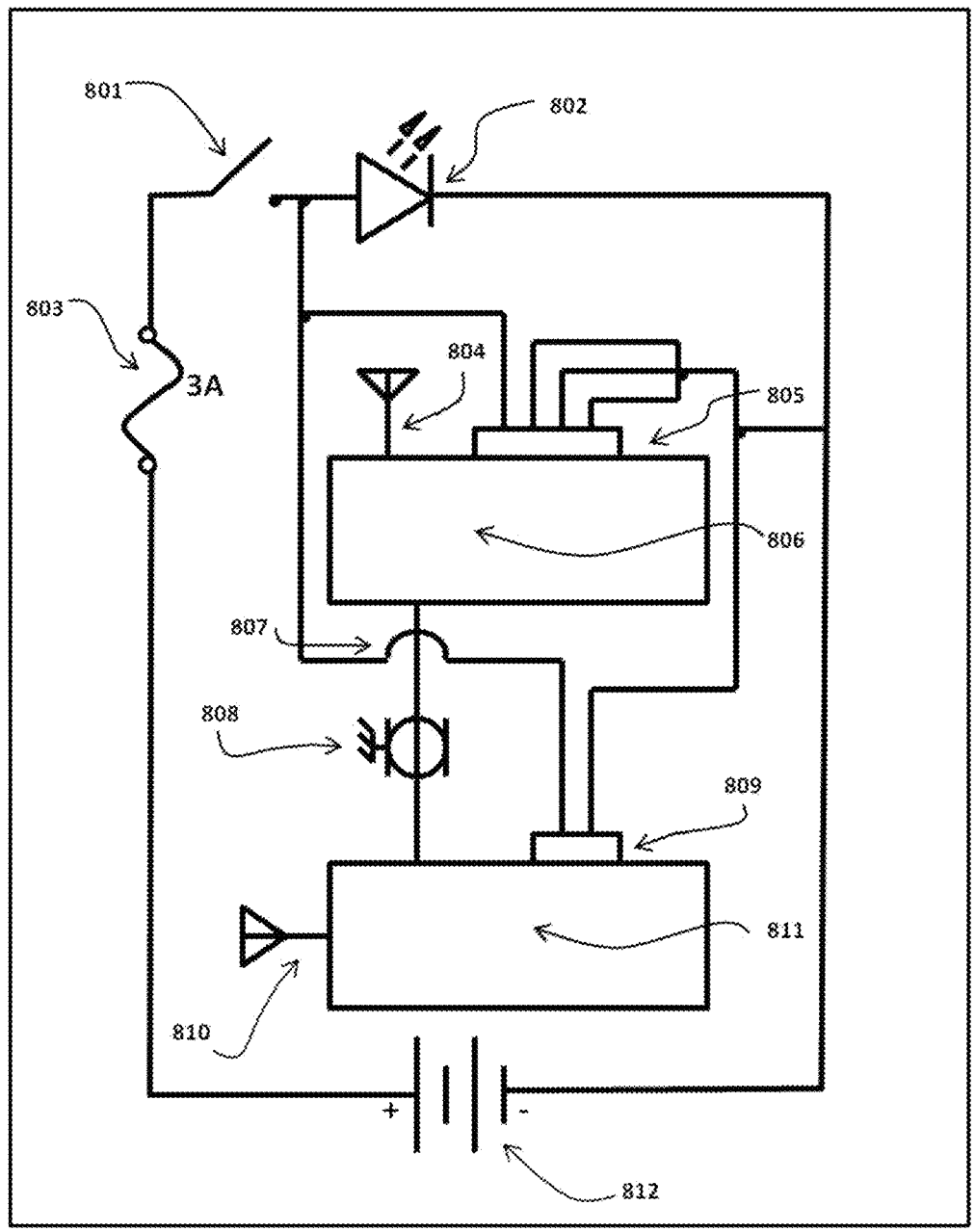
FIG. 8 is a simple electronic circuit diagram of the present device.

As depicted in FIG. 8, the present device comprises a circuit that includes the following components: an on/off switch 801, on/off led 802, fuse 803, receiver antenna 804, a 7 pin connector 805 (diagram only has 4 pins illustrated), a video signal receiver 806, coaxial cable connecting the video receiver 806 and signal processor WiFi transmitter 811, a WiFi antenna 810, and power source 812. Examples of video signal receiver include the AMP VSR1 and VR75. For collecting a digital ISR signal the present device is contemplated to process the ISR signal into an NTSC analog signal that can be processed by the analog to digital converter for WiFi transmission. The power source can be a 12V 2.9 Amp rechargeable NiCad battery, for example, or other battery type. In preferred embodiments, the receiver is an RF video receiver capable of receiving at least one band of frequency through its attached antenna. An antenna as contemplated in the present invention is any antenna capable of capturing a signal of interest and is compatible with the receiver itself. In

TABLE I

| Band | Hertz Range GHz | MHz | ISR device | ISR device spectrum (GHz) | Aerial Platform |
|---|---|---|---|---|---|
| L band | 1-2 | 1000-2000 | AT FLIR | 1.71-1.85 Analog | F/A 18 Hornet |
|  |  |  | Dragon Eye | 1.71-1.85 Analog | RQ-14 |
|  |  |  | Raven | 1.71-1.85 Analog | RQ-11 |
|  |  |  | Pointer | 1.71-1.85 Analog | POINTER |
| S band | 2-4 | 2000-4000 | Scan Eagle | 2.0-4-0 Analog and Digital | Scan Eagle |
| C band | 4-8 | 4000-8000 | Litening Pod | 4.4-4.85 Analog | F/A 18 Hornet |
|  |  |  | Litening Pod | 5.24-5.85 Digital | F/A 18 Hornet |
|  |  |  | Hunter | 4.4-4.85 Analog | RQ-5 |
|  |  |  | GNAT | 4.4-4.85 Analog | GNAT |
|  |  |  | N/A | 5.24-5.85 Digital | P3 |
|  |  |  | Predator | 4.4-4.85 Analog | MQ-1 |
|  |  |  | Predator | 5.24-5.85 Digital | MQ-1 |
|  |  |  | Shadow | 4.4-4.85 Analog | RQ-7 |
|  |  |  | Sniper Pod | 4.4-4.85 Analog | F-15 Strike Eagle |
|  |  |  |  |  | B-1 B Lancer |
|  |  |  |  |  | F-16 Falcon |
|  |  |  |  |  | A-10 Thunderbolt |
|  |  |  |  |  | UK Harrier |
|  |  |  |  |  | UK Tornado GR4 |
| Ku band | 12-18 | 12000-18000 | Fire Scout | 14.4-15.35 Digital | MQ-8 |
|  |  |  |  | 14.4-15.35 Analog and Digital | P-3 |
| K band | 18.26.5 | 18000-26500 |  |  |  |
| Ka band | 26.5-40 | 26500-40000 |  |  |  |

Figure 9:
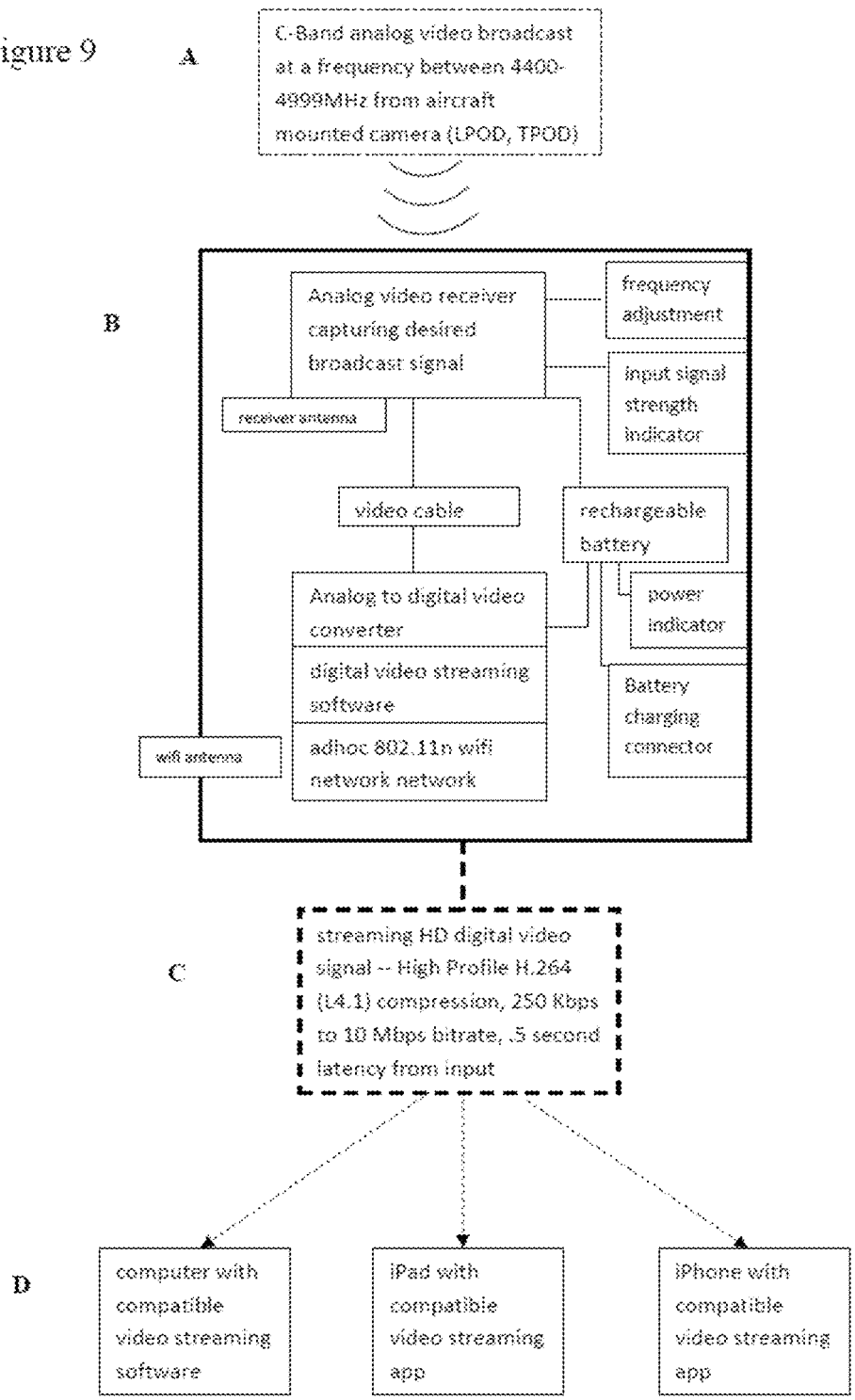
FIGS. 9 A, B, C, and D comprise a schematic drawing of the present device layout (B) and how it interacts with a video source (A) and retransmits (C) to compatible viewing devices (D).
Figure 13:
FIG. 13 is a photograph of the present device next to an iPod and an iPhone to show relative size.

The general flow diagram of one embodiment of the present device is depicted in FIG. 9. Present device B, for example, comprises an analog and digital video receiver that has capability for frequency adjustment, an indicator for measuring and displaying captured signal strength, an analog to digital video converter, software for streaming digital signal, a rechargeable power system, power indicator and a socket for attaching a battery charger or A/C to D/C converter, and receiver and WiFi antennae. The signal strength display can also comprise either a liquid crystal display (LCD) or light emitting diode (LED) format or dial with indicator needle. FIGS. 12A, B, and C show the dimensions of the present device while FIG. 13 shows the relative size of the present device next to an iPod and an iPhone.

The streaming HD digital video output in WiFi can comprise a high profile H.264 (L4.1) compression at a bitrate of between 250 Kbps to 10 Mbps and a 0.5 second latency period from input to output. It is contemplated that video streaming in this mode can be captured by such as an iPad, iPhone other video capture or 'android' type devices (See FIG. 10.)

one embodiment, the present device has the ability to modulate its frequency within a given range via "steps" that vary depending on the frequency band and the method (either manual or electronic) in which the step is initiated. For one embodiment, the steps are initiated by manual switches that step at 1 MHz increments. In another alternate embodiment the step increments are 250 KHz per step. In further preferred embodiments, the incoming frequency is demodulated and the video carrier separated from any other subcarriers that may be present in the signal to include audio. This is then output via a co-axial cable in an NTSC format (525 line) to a signal encoder processor that takes the analog signal and digitizes it in High Definition (HD) H.264 video compression format. This digital signal is then broadcast wirelessly via a 802.11b/g/n (or any other WiFi transmitter) signal carrier to any tablet device. Software is used to allow the re-broadcast signal to be easily captured and used by commercially available video imaging devices.

EXAMPLES

I. F/a-18 Strike Craft Test

In this example, as depicted in FIG. 11, an F/A-18 pilot places the present device within his flight bag, placed behind his seat in the aircraft, turns on the device and obtains an altitude of 20,000 feet. At that height, he proceeds to use the aircraft's camera system to view objects located on the ground with his 5×5 monochromatic monitor. He then turns on an iPad equipped for receiving WiFi signal from the present device. The iPad can rest on the cockpit side panel. Notably, the iPad is already cleared for flight use in F/A-18 aircraft.

As expected, the iPad imaging device provides sharp black and white streaming video images being then captured by the camera. Further, the zoom capability of the camera provides detailed sharp black and white images of the ground based objects observed. (In the F/A 18 used for testing the Litening Pod does not have color capability).

Further still, in an actual test on device robustness, an F/A-18 pilot secured the iPad and commenced performing high gravitational, or g-force maneuvers to test continued signal reception of WiFi signal between the present device and the iPad at high altitude and found the iPad still received viewable video imagery.

II. Ground-Based Test

In this example, the device is placed on the dashboard of a vehicle and turned on. Meanwhile, an overhead aircraft transmits analog or digital video signal of imagery of an area near the vehicle. The ground personnel turn on the compatible video imaging iPad they are carrying and are able to view the camera collected images identifying the location of an area of interest, day or night.

III. In Further Embodiments

The invention has industrial applicability in providing for a solution to bridging a gap between capture of aerial or otherwise remote streaming video and delivery to user friendly mobile COTS WiFi capable video viewing devices. Such applicability can be found, for example, in the hospital environment where a surgeon uses small surgical scopes equipped with a video camera lens to investigate the inner workings of the human body and the like. Currently, cameras in teaching or university hospitals or any hospital that uses such equipment are hardwired to television screens inside surgery rooms and, if available, distributed via a local cable network. However, in application of the present present device, the data from the surgical camera or cameras can be connected to a wireless signal transmitter. If said hospital was to place an individual present device in a surgery room, it could broadcast the surgeon's video wirelessly over WiFi which signal could then be networked to a central surgical classroom or location where it could be monitored over the internet via streaming video. The audience then becomes virtually limitless, where a body of student doctors could be watching a surgical procedure remotely over hundreds or thousands of miles away in real time. This application requires a comprehensive understanding of networking WiFi devices into Local Area Networks as is understood by one of skill in the electronic arts. In a further related embodiment, if said surgeon were conducting his procedure amongst a live audience of students, the signal could be broadcast for each student to view independently on, for example, a WiFi capable iPad while around the surgery table or in overhead viewing auditorium.

In yet another embodiment of use, the present device can close the visual knowledge security gap between commercial pilots in their cockpit and their crew and passengers in the main cabin. The FAA has authorized iPads for use in all models of commercial jet transport aircraft. iPads are used to manage flight publications of all kinds for the entire United States on one portable device. Consequently, in an airplane that has security cameras mounted in the cabin, the pilot who is equipped in the cockpit with an iPad or other WiFi ready tablet device and the current present device, can see the real time status of the crew and passengers. Thus, the present device can provide situational awareness to pilots to a new level not available. Moreover, because increasing numbers of aircraft have WiFi access being broadcast throughout the cabin, it is almost possible to stay permanently connected to the worldwide web. Due to the ability of the present device to be networked, the video imagery of the aircraft's cabins (assuming presence of on-board cameras) could be streamed via wireless link, networked, and fed into the commercial airline's headquarters. For instance, the fleet command center headquarters building of an airline can maintain video surveillance and awareness of each of their aircrafts' cabins for every single airplane airborne, while the video imagery is networked and broadcast into the command center remotely.

Figure 10:
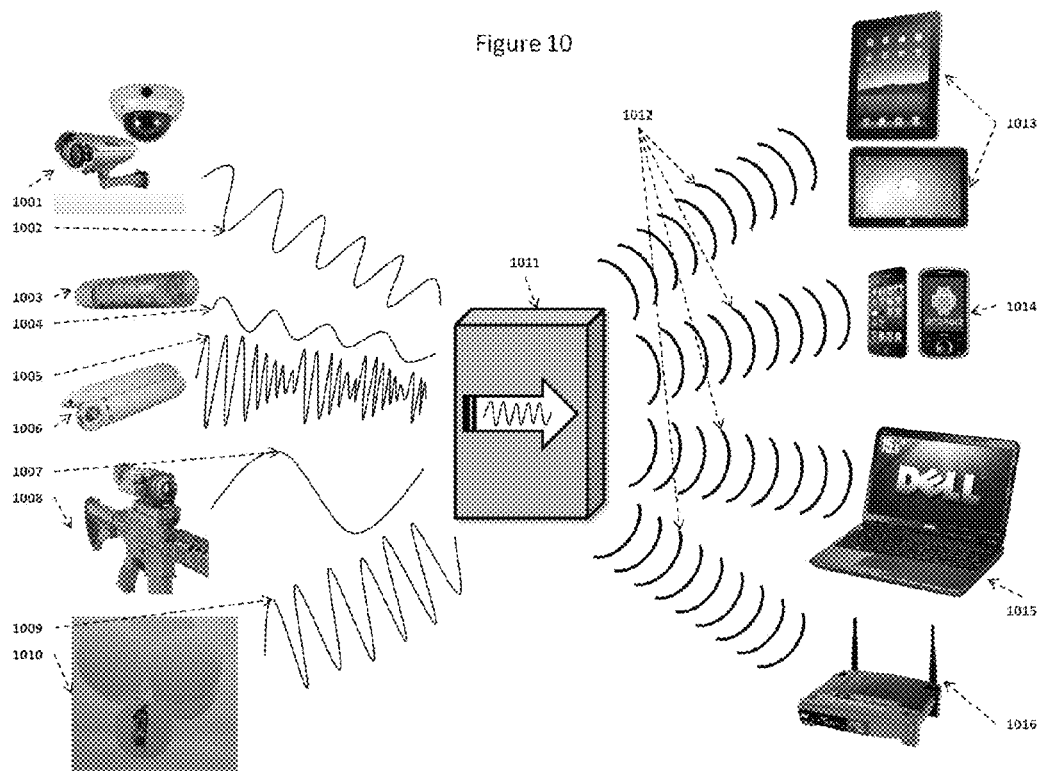
FIG. 10 is a photo collage showing the multiple applications available with the present device, namely receiving data streaming from a variety of resources and broadcasting out to a variety of WiFi compatible video imaging devices.

Still other applications applicable for the present device 1011 are indicated in FIG. 10. For example, in a remote security system 1001 that operates by sending a unique carrier data signal 1002 to a software system, as opposed to hard wired, the present device can capture the video signal and rebroadcast over a WiFi network to any WiFi capable video capable device such as for example, tablet devices such as commercially available iPads 1013, cellular 'smart' phones 1014, laptop computers 1015, and wireless routers 1016 for greater networking of data signal. The same is the case for Litening Pod 1003 and its carrier wave 1004 (in C-band, for example), Advanced Targeting Forward Looking Infrared system (ATFLIR) 1006 and its unique carrier signal (Ku band) 1005, remote weapons sighting platforms 1008 and its data stream signal 1007, recreational, scientific, weather balloons with camera systems 1010 and their data signals 1009, and recreational and business aerial photographic platforms, such as the radio controlled airplanes and Mirokopters (not shown).

All of the compositions and methods disclosed and claimed herein can be made and executed without undue experimentation in light of the present disclosure. While the compositions and methods of this invention have been described in terms of preferred embodiments, it will be apparent to those of skill in the art that variations may be applied to the compositions and methods and in the steps or in the sequence of steps of the method described herein without departing from the spirit and scope of the invention. More specifically, the described embodiments are to be considered in all respects only as illustrative and not restrictive. All similar substitutes and modifications apparent to those skilled in the art are deemed to be within the spirit and scope of the invention as defined by the appended claims.

All patents, patent applications, and publications mentioned in the specification are indicative of the levels of those of ordinary skill in the art to which the invention pertains. All patents, patent applications, and publications, including those to which priority or another benefit is claimed, are herein incorporated by reference to the same extent as if each individual publication was specifically and individually indicated to be incorporated by reference.

The invention illustratively described herein suitably may be practiced in the absence of any element(s) not specifically disclosed herein. Thus, for example, in each instance herein any of the terms "comprising", "consisting essentially of", and "consisting of" may be replaced with either of the other two terms. The terms and expressions which have been employed are used as terms of description and not of limitation, and there is no intention that use of such terms and expressions imply excluding any equivalents of the features shown and described in whole or in part thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

What is claimed is:

1. A signal processing system comprising:
   a) a programmable video receiver (VSR) configured to receive a long-range air-to-ground radio frequency (RF) feed transmitted from an aircraft, said feed comprising a first video signal, and wherein said long-range air-to-ground feed extends from said aircraft to a distance greater than 1000 meters from said aircraft;
   b) a conversion module coupled to the receiver to obtain the first video signal, the conversion module being configured to convert the first video signal into a digital signal for rebroadcasting; and
   c) a transmitter configured to transmit using less than 100 mW and coupled to the conversion module to receive the digital signal and rebroadcast the digital system using a short-range communication standard.

2. A signal processing system according to claim 1, wherein the short-range communication standard is a WiFi standard.

3. A signal processing system according to any one of claims 1, and 2, further comprising a battery for powering the receiver, the conversion module, and the transmitter.

4. A signal processing system according to claim 3, further comprising a housing containing the receiver, the conversion module, the transmitter, and the battery.

5. A signal processing system according to claim 4, further comprising a receiver antenna coupled to the receiver, and a transmitter antenna coupled to the transmitter.

6. A signal processing method, the method comprising steps of:
   a) receiving a long-range air-to-ground radio frequency (RF) feed transmitted from a source located on an aircraft comprising a first video signal; wherein said first video signal can be received at a distance extending from said source on said aircraft to a distance greater than 1000 meters from said aircraft;
   b) converting the first video signal into a digital signal for rebroadcasting; and
   c) transmitting the digital signal using a transmitter configured to transmit using less than 100 mW and using a short-range communication standard.

7. A signal processing method according to claim 6, wherein the short-range communication standard is a WiFi standard.

8. A signal processing method according to claim 6, wherein the step of transmitting uses less than 100 mW of effective radiated power.

9. A signal processing method according to claim 6, wherein the long-range air-to-ground feed extends to at least 1000 meters.

10. A signal processing method according to any one of claim 6, 7, 8, or 9, wherein the method is performed automatically by a self-contained battery powered system.

11. An article of manufacture comprising:
    a) A programmable video signal receiver (VSR) capable of receiving an analog or digital video signal generated from a source on an aircraft, wherein said video signal extends from said source to a distance greater than 1000 meters from said source;
    b) An analog to digital video converter connected with said VSR, wherein said converter can process digital or analog signal for rebroadcast over a WiFi network;
    c) A WiFi antenna connected with said VSR;
    d) A power source in electrical communication with each of said VSR, converter, and antenna; and
    e) A housing containing said power source, VSR, converter and antenna, said article of manufacture capable of wirelessly receiving an either an analog or digital signal video signal stream and rebroadcasting said signal stream by WiFi networking to a portable digital WiFi capable video imaging device.

12. The article of manufacture of claim 11, wherein said video signal which said receiver is capable of receiving is selected from the group consisting of C-Band, KuBand, S-Band, L-B and UHF.

13. The article of manufacture of claim 11, wherein said WiFi is networked using adhoc IEEE 802.11a to n WiFi network extensions.

14. The article of manufacture of claim 11, wherein said power source is selected from a rechargeable battery selected from lithium, carbon zinc, zinc chloride and alkaline batteries.

15. The article of manufacture of claim 11, wherein said power source is by alternating current through a direct current transformer, such as a plug in battery charger.

16. The article of manufacture of claim 11, wherein said housing comprises an impact resistant material selected from the group consisting of metal and plastic.

17. The article of manufacture of claim 11 comprising a circuitry organization comprising an on-off switch, an on-off led, a fuse, a receiver antenna, a video signal receiver in electrical communication with a signal processor WiFi transmitter through a coaxial cable, a WiFi antenna, pin connectors and a power source in electrical communication with said on-off switch, said on-off led, said fuse, said receiver antenna, said pin connectors, said video signal receiver, said coaxial cable, WiFi antenna, and said signal processor WiFi transmitter.

18. The article of manufacture of claim 12 wherein said signal has a frequency of about between 1.625 and 15.35 GHz.

19. The article of manufacture of claim 18 wherein said signal has a frequency of about between 4,400 and 5,850 MHz.

20. The article of manufacture of claim 18, wherein said signal has a frequency of about between 1.71 and 1.85 GHz.

21. The article of manufacture of claim 18, wherein said signal has a frequency of about between 2.0 and 4.0 GHz.

22. The article of manufacture of claim 18, wherein said signal has a frequency of about between 14.4 and 15.35 GHz.

23. A portable video signal capture, signal conversion, and video signal rebroadcast device comprising:
    a) A programmable video signal receiver (VSR) for receiving a video signal transmitted from a source located on an aircraft, said video signal transmitted from an aircraft selected from the group consisting of an analog and a digital signal; and wherein said transmitted video signal can be received by said VSR at a distance extending from adjacent said source on said aircraft to a distance greater than 1000 meters from said aircraft;

b) An analog to digital video converter in electronic communication with said VSR, wherein said converter can process digital or analog signal for rebroadcast over a WiFi network;

c) A WiFi antenna in electronic communication with said VSR;

d) A power source in electrical communication with each of said VSR, converter, and antenna; and e) A housing containing said power source, VSR, converter and antenna, said article of manufacture capable of wirelessly receiving an analog or digital signal video signal stream and rebroadcasting said signal stream by WiFi networking to a portable digital WiFi capable video imaging device.

24. The video system of claim 23, wherein said handheld video imaging device is selected from the group consisting of WiFi capable telephone, iPhone, and iPad.

25. A method for receiving WiFi video stream in a cockpit of an aircraft from an external analog or digital video streaming source comprising:

a) employing a programmable video signal receiver (VSR) located either internal or external to said cockpit, to receive said external analog or digital signal sourced from a video camera system mounted to said aircraft outside of said cockpit that is configured for transmitting analog or digital video signal of imagery remote from said aircraft; and wherein said transmitted video signal can be received by said VSR at a distance extending from adjacent said source on said aircraft to a distance greater than 1000 meters from said aircraft;

b) using an analog to digital converter to convert the analog or digital signal received by the VSR into a digital WiFi signal capable of being transmitted by WiFi, said VSR and digital converter positioned either in a compartment outside said cockpit or within said cockpit; and c) streaming said digital signal by WiFi to a handheld video imaging device within said cockpit, said device capable of receiving said digital WiFi signal and displaying said video imagery in real time.

26. A video system for wirelessly transmitting video images to a display in an aircraft cockpit comprising:

a) An analog or digital video stream receiver for receiving an analog or digital video imagery broadcast signal sourced from a video imaging system mounted to said aircraft outside of said cockpit, said imaging system configured for transmitting analog or digital video signal of imagery remote from said aircraft, said imagery broadcast signal further capable of being received by said receiver from a location within said aircraft to a distance greater than 1000 meters from said aircraft;

b) a receiver/transmitter disposed within a compartment within said aircraft or within said cockpit, said receiver/transmitter capable of receiving said analog or digital video signal from said imaging system, converting said analog or digital signal to a digital WiFi signal, said receiver/transmitter further including a power source; and c) A handheld video imaging device capable of receiving said digital WiFi signal and displaying said video imagery in real time.

27. A video system for wirelessly transmitting video images to a video image display device comprising:

a) An analog or digital video stream receiver for receiving an analog or digital video imagery broadcast signal sourced from a video imaging system mounted remotely from said image display device, said imaging system configured for transmitting from an aircraft an analog or digital video signal of imagery to said remotely located display device, said video stream receiver further capable of receiving said video imagery broadcast signal from said imagery broadcast signal's source to a distance greater than 1000 meters from said broadcast signal source;

b) a receiver/transmitter capable of receiving said analog or digital video signal from said imaging system, converting said analog or digital signal to a digital WiFi signal, said receiver/transmitter further including a power source; and c) A handheld video imaging device capable of receiving said digital WiFi signal and displaying said video imagery in real time.

* * * * *

UNITED STATES PATENT AND TRADEMARK OFFICE
CERTIFICATE OF CORRECTION

PATENT NO. : 8,887,208 B1  Page 1 of 1
APPLICATION NO. : 13/866226
DATED : November 11, 2014
INVENTOR(S) : David Aaron Merritt et al.

It is certified that error appears in the above-identified patent and that said Letters Patent is hereby corrected as shown below:

On the title page, item (54) and in the specification, col. 1, line 1, there is a spelling error in the title wherein the word "Fidelity" has been misspelled as "Fedelity". Thus the title of the patent should read, "PORTABLE REAL-TIME VIDEO SIGNAL CAPTURING, TRANSFORMING AND RELAY SYSTEM FOR TRANSMITTING HIGH FIDELITY VIDEO IMAGERY BY WIFI TO PORTABLE VIDEO IMAGING DEVICES"

On the title page, items (71) and (72), the first inventor's last name has been misspelled on the face of the published patent no. 8,887,208. The misspelling error has left a single 't' off the name. The correct spelling has two 'tt's at the end. Thus, the first inventor's name is David Aaron Merritt.

Signed and Sealed this
Twenty-fifth Day of August, 2015

Michelle K. Lee
*Director of the United States Patent and Trademark Office*